United States Patent
Curnutt (10) Patent No.: US 10,828,811 B2
(45) Date of Patent: *Nov. 10, 2020

(54) POLYMER SEALED IN-MOLD DECORATION AND METHOD OF MANUFACTURE

(71) Applicant: Curnutt Products, LLC, Vista, CA (US)

(72) Inventor: Timothy P. Curnutt, Vista, CA (US)

(73) Assignee: CURNUTT PRODUCTS, LLC

( * ) Notice: Subject to any disclaimer, the term of this patent is extended or adjusted under 35 U.S.C. 154(b) by 228 days.

This patent is subject to a terminal disclaimer.

(21) Appl. No.: 15/997,938

(22) Filed: Jun. 5, 2018

(65) Prior Publication Data

US 2019/0168429 A1 Jun. 6, 2019

Related U.S. Application Data

(60) Continuation of application No. 15/220,265, filed on Jul. 26, 2016, now Pat. No. 9,987,778, which is a (Continued)

(51) Int. Cl.
| | |
|---|---|
| *B29C 45/00* | (2006.01) |
| *B32B 27/06* | (2006.01) |
| *B32B 15/08* | (2006.01) |
| *B32B 27/08* | (2006.01) |
| *B32B 27/20* | (2006.01) |
| *B32B 1/00* | (2006.01) |

(Continued)

(52) U.S. Cl.
CPC .... *B29C 45/0003* (2013.01); *B29C 45/14688* (2013.01); *B29C 45/1671* (2013.01); *B32B 1/00* (2013.01); *B32B 3/02* (2013.01); *B32B 3/04* (2013.01); *B32B 15/08* (2013.01); *B32B 27/06* (2013.01); *B32B 27/08* (2013.01); *B32B 27/20* (2013.01); *B29L 2009/00* (2013.01); *B32B 2307/714* (2013.01); *B32B 2451/00* (2013.01); *B32B 2601/00* (2013.01); *Y10T 428/26* (2015.01); *Y10T 428/31504* (2015.04); *Y10T 428/31678* (2015.04)

(58) Field of Classification Search
CPC .................................................. B29C 45/0003
USPC ........................................................ 428/66
See application file for complete search history.

(56) References Cited

U.S. PATENT DOCUMENTS

| | | | |
|---|---|---|---|
| 9,399,337 B2 * | 7/2016 | Curnutt | B32B 27/06 |
| 2010/0248873 A1 * | 9/2010 | Cooper | A63B 41/08 |
| | | | 473/599 |
| 2012/0046125 A1 | 2/2012 | Sullivan | |

* cited by examiner

*Primary Examiner* — Brent T O'Hern
(74) *Attorney, Agent, or Firm* — Gary L. Eastman, Esq.; Eastman McCartney Dallmann LLP (57) ABSTRACT

An injection molded product formed from an inner layer, or substrate, to which an aesthetic IMD layer is bonded during a first injection molding process, leaving a portion of the substrate exposed about the perimeter(s) of the substrate. A transparent outer layer, or overmold, is then injection molded over the top of the IMD layer and substrate, bonding substantially to the IMD layer and to the substrate where it remains exposed following the first injection molding. The process of forming a product through the disclosed two-step injection molding process creates a customizable, aesthetic product with an aesthetic IMD layer completely encapsulated between the substrate and a clear overmold in such a way to protect the IMD layer from the environment in which the product is used.

8 Claims, 6 Drawing Sheets

Related U.S. Application Data division of application No. 14/191,301, filed on Feb. 26, 2014, now Pat. No. 9,399,337.

(60) Provisional application No. 61/769,277, filed on Feb. 26, 2013.

(51) Int. Cl.
*B32B 3/02* (2006.01)
*B32B 3/04* (2006.01)
*B29C 45/16* (2006.01)
*B29C 45/14* (2006.01)
*B29L 9/00* (2006.01)

POLYMER SEALED IN-MOLD DECORATION AND METHOD OF MANUFACTURE

RELATED APPLICATION

The present application is a continuation application of, and claims the benefit of priority to, U.S. patent application Ser. No. 15/220,265, filed on Jul. 26, 2016 and currently co-pending, entitled "Polymer Sealed In-Mold Decoration and Method of Manufacture," which is a divisional application of, and claims the benefit of priority to, U.S. Utility patent application Ser. No. 14/191,301, filed on Feb. 26, 2014 entitled "Polymer Sealed In-Mold Decoration and Method of Manufacture," now U.S. Pat. No. 9,399,337, which in turn claims the benefit of priority to U.S. Provisional Application Ser. No. 61/769,277, filed on Feb. 26, 2013, entitled "Polymer Sealed In-Mold Decoration and Method of Manufacture."

FIELD OF THE INVENTION

The present invention relates generally to injection molding. The present invention is more particularly, but not exclusively, an injection molded product which has at least an outer and inner layer of injection molded material and a graphic layer sealed between the inner and outer layers in such a way to protect the graphic layer from the environment where the product is used.

BACKGROUND OF THE INVENTION

Injection molding is a manufacturing process for producing parts through injection of a material into a mold. Injection molding can be performed with many different materials such as metals, thermoplastic polymers, thermoset polymers, glasses, confections, and many other materials.

The most common material utilized for such processes are thermoplastic polymers and elastomers, usually employed to produce common plastic parts, tools, and toys. The process of injection molding of thermoplastic polymers includes melting a given material and forcing it into a mold cavity and allowing it to cool. Parts such as car fenders and bumpers are commonly a product of the injection molding process.

In-mold decoration ("IMD") is a special type of injection molding that is used to apply a graphical or colorful aspect to the molded structure. Some applications also result in an abrasion-resistant, UV resistant, and/or chemical resistant coating. In such an embodiment, a carrier layer containing the resistant coating is laid inside an open mold, prior to injection. The mold is closed, the material is injected, and the graphics and abrasion coating is transferred from the carrier layer and bonded to the injected material, creating a single part with the specialized coating. Use of the IMD process in a graphical or color application operates through a similar process.

While a convenient way to create a useful molded structure, the graphical or colored layer is subject to an external environment. Through IMD, a graphical layer is adhered to a given part, but when subjected to a given environment for long periods, the graphical layer rapidly deteriorates. This can be seen on items having an applied graphical layer left outside in hot or extremely cold temperatures for long periods of time, such as car parts, or underwater pool components. These parts deteriorate rapidly because they lack sufficient protection from their environment. This is due at least in part to oxygen or other contaminates in proximity to the graphic that oxidize or otherwise degrade the graphical layer applied. Even with a protective coating applied to the outside of the part a colored or graphical coating adhered through IMD will tend to deteriorate, because the edges of the part, where the individual coatings meet are not completely sealed and allow intrusion of damaging substances. This is especially true in a harsh, chemically treated underwater environment such as a pool or spa or molded plastic parts on a car parked in the desert. This occurs because either the graphical layer is not protected at all, only receives limited protection from a third thin layer sprayed, printed or flood applied to the outside of the graphic that is not well sealed at the edges, or the protective layer itself deteriorates over time.

In light of the above, it would be advantageous to provide a two-layer IMD product that completely and hermetically encapsulates a graphical layer between the inner and outer layers, completely protecting it from the external environment. It would be further advantageous to provide a method of manufacture to produce a two-layer IMD product that can withstand harsh, chemically treated environments such as a pool or spa.

SUMMARY OF THE INVENTION

The polymer sealed in-mold decoration ("IMD") and method of manufacture of the present invention utilizes the process of IMD and two-shot molding to create a three layer construction formed of a first molded layer ("first shot") and a second molded layer ("second shot") interposed with a graphical or color layer referred to herein as the "IMD Layer." The process is generally referred to herein as "Two Shot In-Mold Decoration," or "Two Shot IMD." The first shot creates the "substrate," while the second shot constitutes what will become an "overmold," protecting the IMD layer between the two.

The IMD layer can be formed of any practical substance containing graphics or colors and textures, utilizing the In-Mold Decoration process. There are three general categories of IMD layer. The first is a Flat Applique or In-Mold Labeling ("IML"). This category includes of a piece of film or polymer foil that is colored or decorated, cut to size, and then placed into the mold prior to the first shot. The second type is a "formed" applique or "three dimensional" ("3D") IMD. This type of IMD layer is formed from a piece of film or polymer foil that is colored or decorated and contoured to match the shape of the final product, and then cut to size. The third variety is "Reel-to-Reel" IMD or "IMR." This category comprises a decorative ink layer and top coat carried on a polymer film that is placed inside the mold during the molding process. The heat and pressure of the molding process transfers the ink structure and top layers from the polymer film to the first shot. The entirety of polymer film in this case does not become part of the two-shot IMD product, only the graphics or colors and topcoats are transferred to the substrate.

The IMD layer is positioned within the mold prior to injecting the material for the first molded layer, or substrate. Through the first step of the IMD process, or "first shot," the substrate material is injected into the mold over the IMD layer and becomes substantially bonded to one side of the substrate. The IMD layer substantially covers the exposed portion of the substrate, except for a portion surrounding the entirety of the internal and external perimeters of the IMD layer. This step results in certain areas where the substrate material remains completely exposed, surrounding the internal and external perimeters of the IMD layer.

A second molded layer, or overmold, is injected into another cavity of an injection mold, completely covering and bonding to the IMD layer and the portion of the first molded layer that remained exposed after the first shot. The overmold bonds to the IMD layer and the surrounding exposed area of the substrate as it cools and polymerizes, hermetically sealing the IMD layer within a protective polymer barrier. The area that remained exposed after the first shot polymerizes with the overmold following the second shot, becoming a single piece and completely encapsulating the IMD layer within a protective polymer shield completely devoid of contaminants and impervious to air or gases.

The materials for both the substrate and overmold are chosen for their properties as a functional part and for their ability to protect the IMD layer from its intended environment. The combination of the substrate, IMD layer, and overmold completely bond to each other, creating a unitary whole with no seams, protected from the external environment.

DESCRIPTION OF THE DRAWING

The objects, features, and advantages of the method according to the invention will be more clearly perceived from the following detailed description, when read in conjunction with the accompanying drawing, in which.

DETAILED DESCRIPTION

Figure 1:
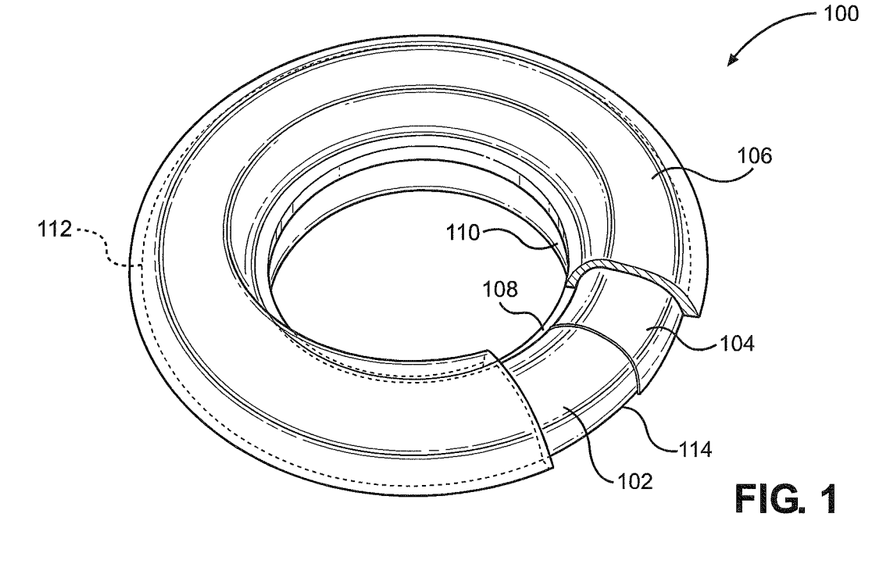
FIG. 1, is a perspective cutaway view of a top of a preferred embodiment of an exemplary bezel, created through a preferred embodiment of the two-shot in-mold decoration method of the present invention, showing an IMD layer bonded to the substrate on one side, leaving a portion of the substrate exposed on the interior perimeter and exterior perimeter of the substrate, and the overmold bonded over the IMD layer and to the exposed portions of the substrate, hermetically sealing the IMD layer in between the substrate and overmold.

Referring initially to FIG. 1, an exemplary polymer-sealed in-mold decoration ("IMD") bezel created by the method of manufacture ("Two Shot IMD") of the present invention is shown from a perspective view and generally labeled 100.

A substrate 102 is shown on the inside of bezel 100, through a cutaway of both an IMD layer 104 and an overmold 106. During the process, material that will become substrate 102 is injected into a mold containing a material selected as the IMD layer 104. Notionally, the material that forms the substrate 102 is a polymer such as a thermoplastic or similar. It is to be understood by those skilled in the art that the material employed during the first shot is not to be considered limiting. The critical aspect of the selection of the polymer, metal, or other material in use, is the substantial adhesion by the materials to either side of the IMD layer 104 and to exposed portions (discussed below) of the overmold 106. Certain combinations of materials perform this function better than others and there are numerous combinations known in the art.

At the beginning of the two shot IMD process, the IMD layer 104 is positioned to bond with the first shot that will become the substrate 102. During this step, discussed more fully below with respect to FIG. 7, the IMD layer 104 can be physically placed inside a mold (not shown) prior to injection of the substrate 102 material. Alternatively, the IMD layer 104 can be formed of a graphical or colored layer carried on a polymer film that is passed through the mold and transferred to the substrate.

In a preferred embodiment, IMD layer 104 is quite thin, generally ranging from approximately 0.001" to 0.025" thick. IMD layer 104 may be a flexible foil, polymer, or other material and could be formed to precisely fit the substrate 102 when molded.

In a preferred embodiment the IMD layer 104 can be formed from another thin layer of polymer with a custom pattern or solid color creating the desired aesthetic effect. Another preferred embodiment is a metallic foil, providing a shiny or metallic effect. Here again, selection of the material comprising the IMD layer 104 layer must be considered in light of the materials used for the other two layers of the construction so as ensure maximize adhesion and/or polymerization between the different layers of construction.

In a preferred embodiment, the IMD layer 104 is sized to have a surface area slightly smaller than the substrate, and positioned within the mold prior to the first shot. This ensures that following injection of the substrate 102 material into the mold, there remains an exposed internal portion 108 of the substrate 102 about internal perimeter 110 and an exposed external portion 114 (shown in FIG. 4) about the external perimeter 112 of the substrate 102. This provides sufficient surface area on the substrate 102 to which the material forming the overmold 106 will bond to create the desired seal around the IMD layer 104. It is to be appreciated that a product created through the two shot IMD process of the present invention is not necessarily required to have both an internal perimeter 110 and an external perimeter 112 as other constructions may only have an external perimeter 112 (as shown in FIGS. 7 through 10).

The overmold 106 material is injected into the mold over the IMD layer 104 during the second shot. A preferred embodiment of the overmold 106 is selected from transparent or translucent materials suitable for the IMD process, such as polymers. The transparent or translucent characteristics of the overmold 106 allow a user to enjoy the aesthetic effect of a particular IMD layer 104, while protecting the IMD layer 104 from the external environment. The overmold 106 may alternatively incorporate ultraviolet ("UV") or other light blocking characteristics, further protecting the IMD layer 104 and structural integrity of the overmold 106.

The IMD process requires a fluid material, which is often a molten thermoplastic, elastomer, or other polymer. The molten overmold 106 material is injected into the mold over the IMD layer 104 during the second shot and is allowed to repolymerize and solidify, bonding substantially to the IMD layer 104. Importantly, the overmold 106 material also bonds to the exposed portions 108 and 114 of the substrate 102. The molten overmold 106 material is then allowed to cool and as it does, its molecules align with those of the substrate 102 as the two layers repolymerize, forming a unitary bezel 100, hermetically sealing IMD layer 104 at the edges defined by internal perimeter 110 and external perimeter 112.

The repolymerization of the substrate 102 and the overmold 106 in the areas defined by the exposed internal area 108 and the exposed external area 114 is unlike using an adhesive to seal two exemplary parts together. In metal welding, a heat source is used to heat metals and join the softened edges of two separate portions into one. The same can be accomplished with thermoplastics where heat is applied to separate plastic surfaces to the point of softening, the separate parts are joined together and allowed to cool, creating a single unitary part.

The present invention is distinct in application. The substrate 102 and overmold 106 are each softened or melted and become fluid prior to injection. The fluid substrate 102 and overmold 106 individually flow to conform precisely to the inner dimensions of the mold, bonding to the IMD layer 104 in the process. The molten overmold 106 material flows into the mold, over the IMD layer 104, over the exposed internal portion 108 of the substrate 102, and over the exposed outer portion 114 of the substrate 102, bonding to all three as it cools and repolymerizes. This allows the adjacent materials to seamlessly join on a molecular level. Thus, unlike gluing parts together with a separate adhesive layer where cured glue bears any strain applied to the parts joined by the glue, the substrate 102 and overmold 106 are bonded at a molecular level, and become a single part when complete. Additionally, where a conventional "weld" leaves an unsightly seam where two portions have been joined, the process of the present invention has no physical seam, as they become a unitary whole conforming to the shape of the particular mold in use.

Figure 2:
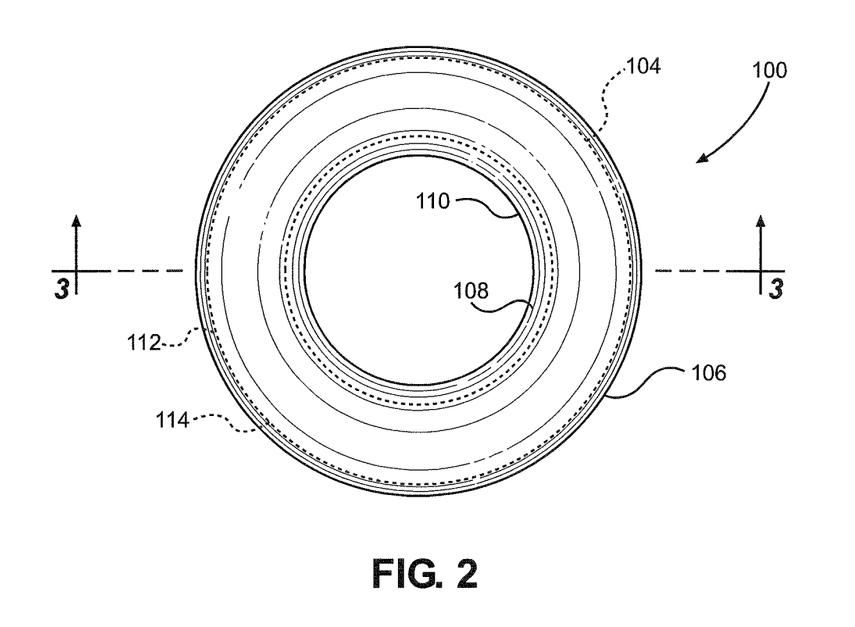
FIG. 2 is a diagrammatic plan view of the top of the bezel of FIG. 1, showing the interior perimeter of the bezel, exterior perimeter of the bezel, the relative size of the IMD layer as compared to the substrate, and the area of the exposed substrate on the interior and exterior perimeters of the IMD layer, and cross section 3-3.

Referring now to FIG. 2, a plan view of a preferred embodiment of a bezel 100 created through the polymer sealed in-mold decoration process of the present invention is shown. The external perimeter 112 and internal perimeter 110 are both shown in relation to the IMD layer 104, shown in dashed lines. The relative sizes of the substrate 102 and the overmold 106 can be appreciated from this perspective, as well as the exposed internal portion 108 and the exposed external portion 114 of the substrate 102 (shown more clearly in FIG. 4).

Figure 3:
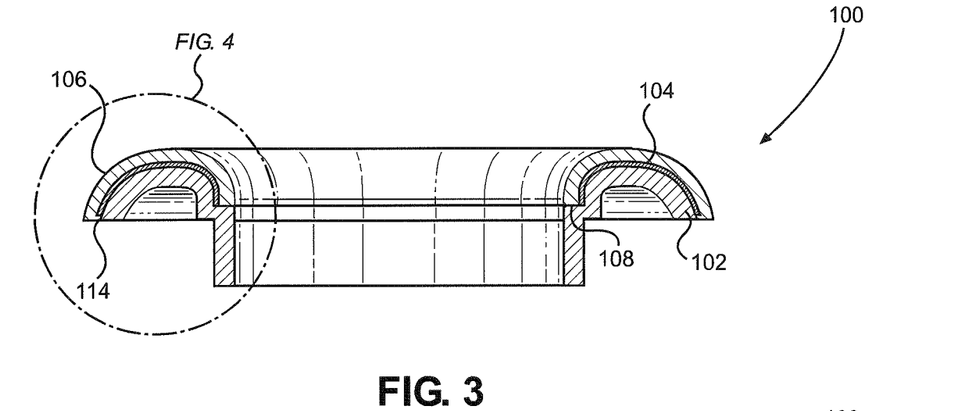
FIG. 3 is a cross section of the bezel of FIG. 1 taken along the line 3-3 of FIG. 2, showing the position of the IMD layer between the substrate and the overmold, the portions of the substrate that remain exposed following the first shot of the in-mold decoration process, and the overlapped areas between the substrate and the overmold that completely encapsulate and hermetically seal the IMD layer.

Referring now to FIG. 3, a cross section of bezel 100 taken along the line 3-3 of FIG. 2 is shown. The substrate 102 is shown on the bottom, bonded substantially to the IMD layer 104 on their adjacent faces while a clear overmold 106 is bonded to the opposite face of the IMD layer 104. It is to be appreciated by those skilled in the art that the selection of three layers should not be considered limiting. While three layers (substrate 102, IMD Layer 104, and overmold 106) might be optimal for the production of bezel 100, additional layers might be required to change the color, add another visual effect to the bezel 100, or another protective layer.

Figure 4:
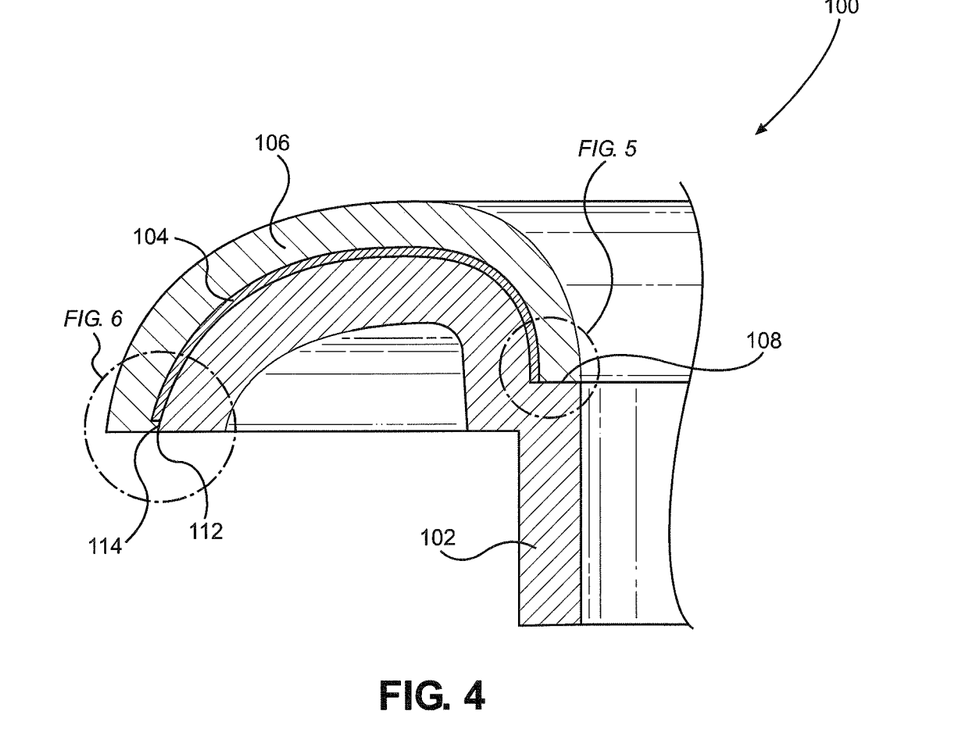
FIG. 4 is a close up view of the area defined by FIG. 4 of FIG. 3, depicting the IMD layer situated over the substrate leaving portions of the substrate material where the overmold is bonded to the substrate, completely encapsulating and hermetically sealing the IMD layer.
Figure 5:
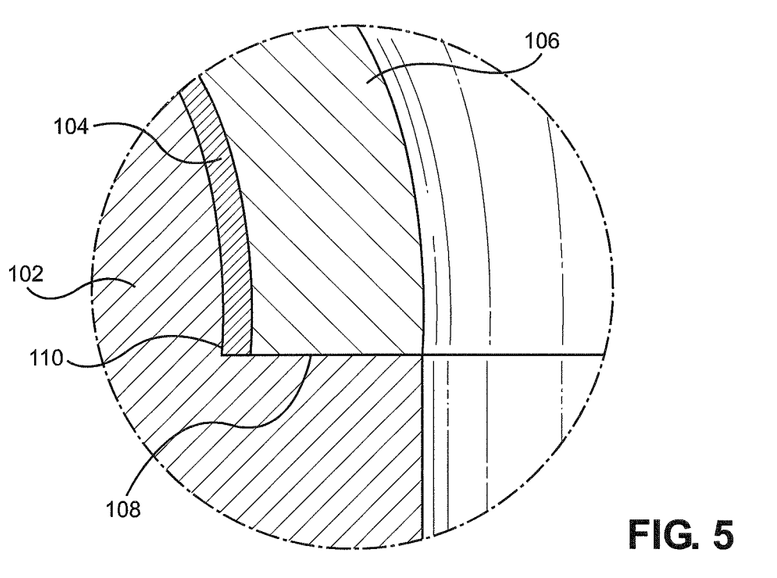
FIG. 5 is a close up of the area defined by FIG. 5 of FIG. 4, showing the area around the internal perimeter of the substrate left exposed by the IMD layer following the first shot of the process of the present invention that bonds to the overmold following the second shot, encapsulating the IMD layer.
Figure 6:
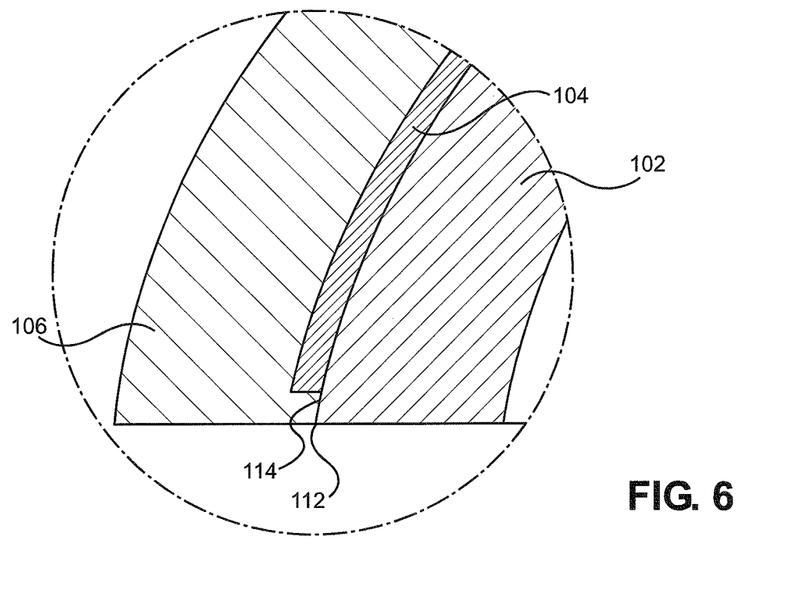
FIG. 6 is a close up of the area defined by FIG. 6 of FIG. 4, showing the area around the external perimeter of the substrate left exposed by the IMD layer following the first shot of the process of the present invention that bonds to the overmold following the second shot, encapsulating the IMD layer.

The exposed internal portion 108 and the exposed external portion 114 are of primary importance and shown in greater detail in FIGS. 4, 5, and 6. Following the repolymerization of the molten overmold 106 material with the substrate 102, the two layers become one, hermetically sealing the IMD layer 104 between them protecting it from the external environment.

Referring to FIG. 4, a close up of the area defined by FIG. 4 of FIG. 3, depicting the interactions of the three primary layers of the present invention is shown. This Figure shows the interaction of the substrate 102, IMD layer 104, and overmold 106 in greater detail, especially where substrate 102 and overmold 106 bond at exposed internal portion 108 on the internal perimeter 110 and at the external perimeter 112 on exposed external portion 114. Both of the exposed internal portion 108 and exposed external portion 114 are critical to the present invention as they hermetically seal the IMD layer 104 within a polymer barrier.

Referring now to FIG. 5, a close up of the area defined by FIG. 5 of FIG. 4 is shown. Here, the exposed internal portion 108 of the substrate 102 is shown where it is bonded to a clear polymer overmold 106. This feature is a critical aspect of the encapsulation of the IMD layer 104. Without such an overlap on the internal perimeter 110 of the bezel 100, the overmold 106 would not create an effective seal, allowing water, air, or other contaminants to seep into the cracks, eventually deteriorating the IMD layer 104 and destroying bezel 100. The present invention encapsulates the IMD layer 104 hermetically sealing it and eliminating any cracks between the substrate 102 and the overmold 106 into which contaminants might penetrate.

Referring now to FIG. 6, a close up of the area defined by FIG. 6 of FIG. 4 is shown, depicting the exposed external portion 114 of substrate 102 where it is bonded to the clear polymer overmold 106. The bonding of the substrate 102 and overmold 106 at the exposed external portion 114 is a further critical feature serving the same purpose as the exposed internal portion 108 shown in FIG. 5, to encapsulate the IMD layer 104 within a protective polymer shield.

Figure 7:
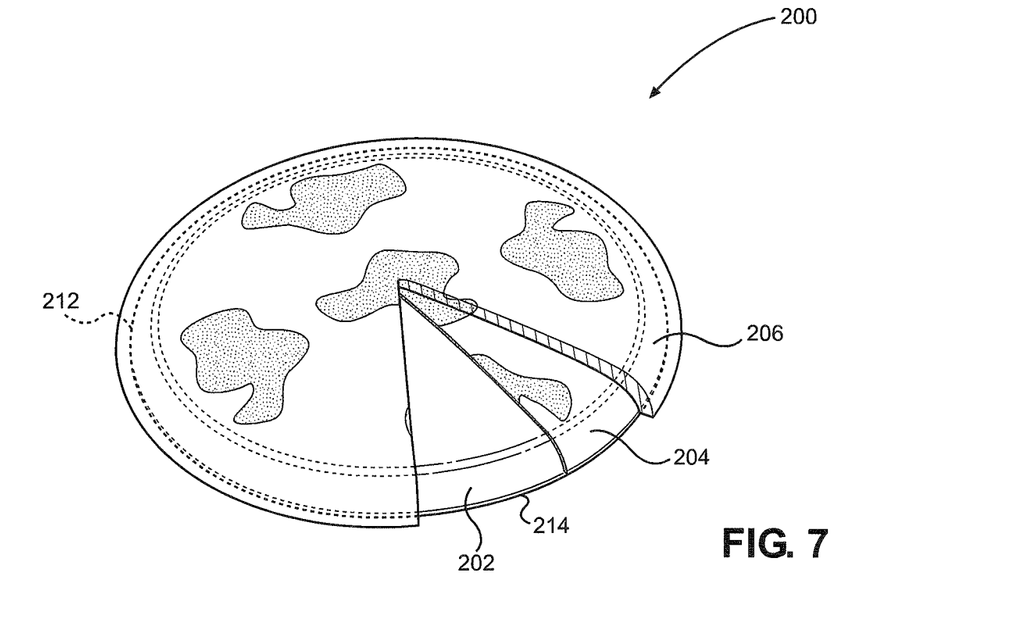
FIG. 7, is a perspective cutaway view of a the top of a preferred embodiment of an exemplary Dome, created through a preferred embodiment of the two-shot in-mold decoration method of the present invention, showing an IMD layer bonded to the substrate on one side, leaving a portion of the substrate exposed on the exterior perimeter of the substrate, and the overmold bonded over the IMD layer and to the exposed portions of the substrate, hermetically sealing the IMD layer in between the substrate and overmold.

Referring now to FIG. 7, an exemplary polymer-sealed in-mold decoration ("IMD") Dome created by the method of manufacture ("Two Shot IMD") of the present invention is shown from a perspective view and generally labeled 200.

A substrate 202 is shown on the inside of Dome 200, through a cutaway of both an IMD layer 204 and an overmold 206. The same two shot IMD process described above for FIGS. 1 through 6 is used here for FIGS. 7 through 10. The importance of FIGS. 7 through 10 as compared to FIGS. 1 through 6 is to show that a product created through the two shot IMD process of the present invention may only have an external perimeter 212.

Accordingly, the aforementioned materials selected that form the substrate 102, the IMD layer 104, and overmold 106 can be used here for the substrate 202, the IMD layer 204, and overmold 206. Similarly, the size of each layer in each of the exemplary embodiments described above for FIGS. 1 through 6 can apply for FIGS. 7 through 10 as well.

As described above, during that process, material that will become substrate 202 is injected into a mold containing a material selected as the IMD layer 204. In a preferred embodiment, the IMD layer 204 is positioned within the mold prior to the first shot and then the substrate 202 material is injected into the mold, where there remains only an exposed external portion 214 (shown in FIG. 10) about the external perimeter 212 of the substrate 202. Subsequently, the second shot, having the material forming the overmold 206, is injected over the IMD layer 204, and will bond to create the desired seal around the IMD layer 204. The molten overmold 206 material is allowed to repolymerize and solidify, bonding substantially to the IMD layer 204. Importantly, the overmold 206 material also bonds to the exposed portion 214 of the substrate 202. The molten overmold 206 material is then allowed to cool and as it does, its molecules align with those of the substrate 202 as the two layers repolymerize, forming Dome 200, hermetically sealing IMD layer 204 at the edge defined by external perimeter 212.

Figure 8:
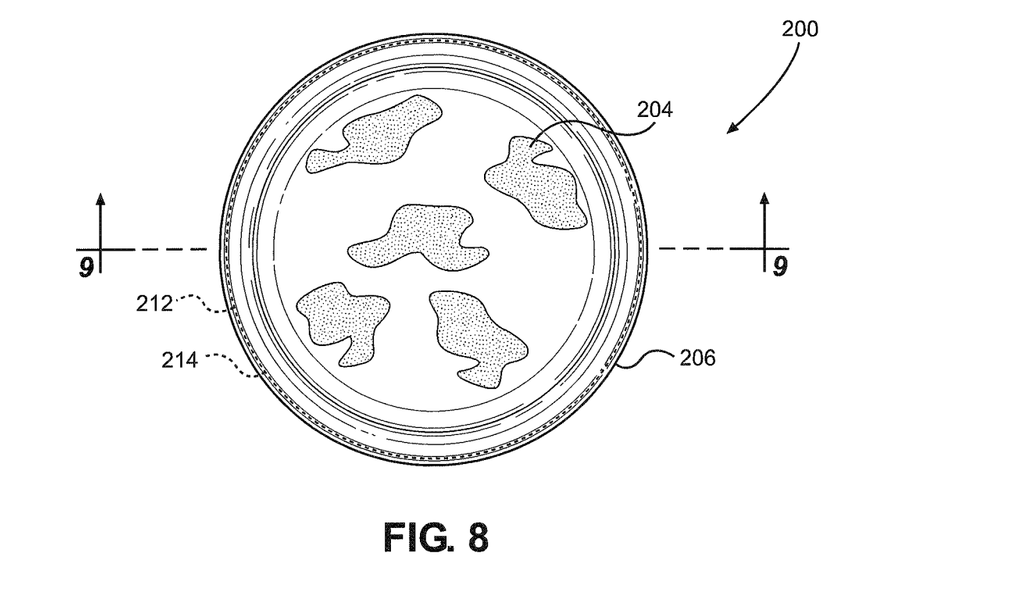
FIG. 8 is a diagrammatic plan view of the top of the Dome of FIG. 7, showing the exterior perimeter of the magnet, the relative size of the IMD layer as compared to the substrate, and the area of the exposed substrate on the exterior perimeter of the IMD layer, and cross section 9-9.

Referring now to FIG. 8, a plan view of a preferred embodiment of a Dome 200 created through the polymer sealed in-mold decoration process of the present invention is shown. The external perimeter 212 is shown in relation to the IMD layer 204. The relative sizes of the substrate 202 and the overmold 206 can be appreciated from this perspective, indicating the exposed external portion 214 about the external perimeter 212 of the substrate 202.

Figure 9:
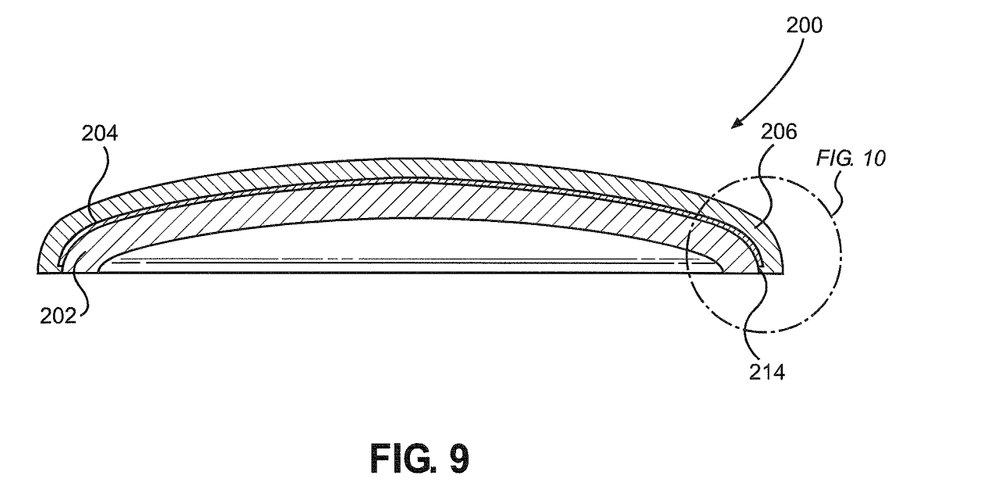
FIG. 9 is a cross section of the Dome of FIG. 7 taken along the line 9-9 of FIG. 8, showing the position of the IMD layer between the substrate and the overmold, the portions of the substrate that remain exposed following the first shot of the in-mold decoration process, and the overlapped areas between the substrate and the overmold that completely encapsulate and hermetically seal the IMD layer.

Referring now to FIG. 9, a close up of the area defined by FIG. 9 of FIG. 8 is shown. The substrate 202 is shown on the bottom, bonded substantially to the IMD layer 204 on their adjacent faces while a clear overmold 206 is bonded to the opposite face of the IMD layer 204. It is to be appreciated by those skilled in the art that the selection of three layers should not be considered limiting. While three layers (substrate 202, IMD Layer 204, and overmold 206) might be optimal for the production of Dome 200, additional layers might be required to change the color, add another visual effect to the Dome 200, or another protective layer.

Figure 10:
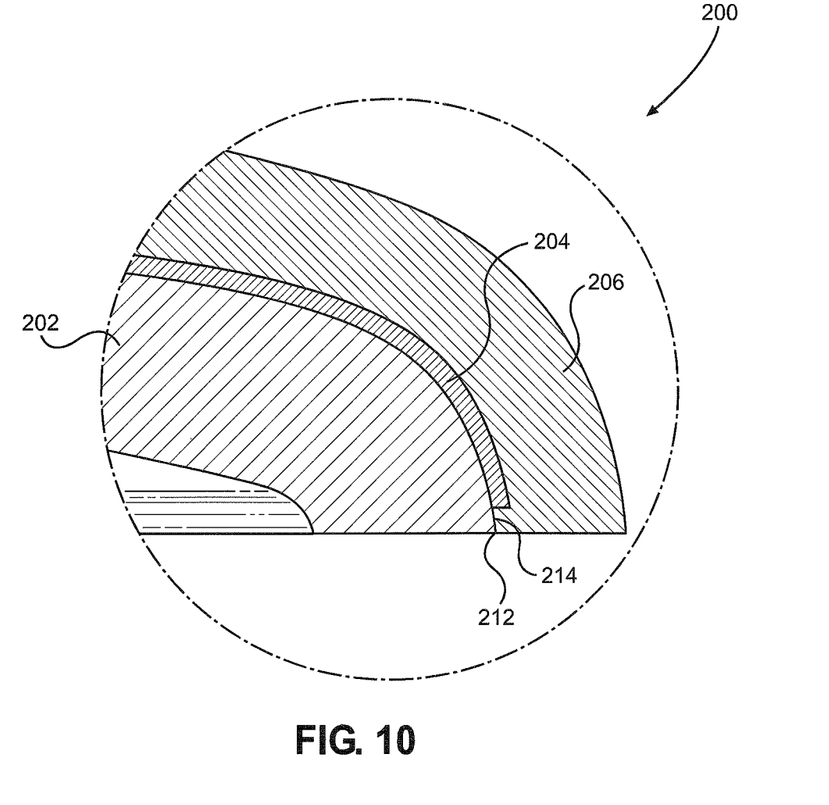
FIG. 10 is a close up view of the area defined by FIG. 10 of FIG. 9, depicting the IMD layer situated over the substrate leaving portions of the substrate material exposed where the overmold is bonded to the substrate, completely encapsulating and hermetically sealing the IMD layer.

The exposed external portion 214 is of primary importance and shown in greater detail in FIG. 10. Following the repolymerization of the molten overmold 206 material with the substrate 202, the two layers become one, hermetically sealing the IMD layer 204 between them protecting it from the external environment.

Referring to FIG. 10, a close up of the area defined by FIG. 10 of FIG. 9 is shown, bringing attention to the areas on the external perimeter 212. This Figure shows the interaction of the substrate 202, IMD layer 204, and overmold 206 in greater detail, especially where substrate 202 and overmold 206 bond at exposed external portion 214 at external perimeter 212. The exposed external portion 214 hermetically seals the IMD layer 204 within a polymer barrier and is critical to the present invention.

Figure 11:
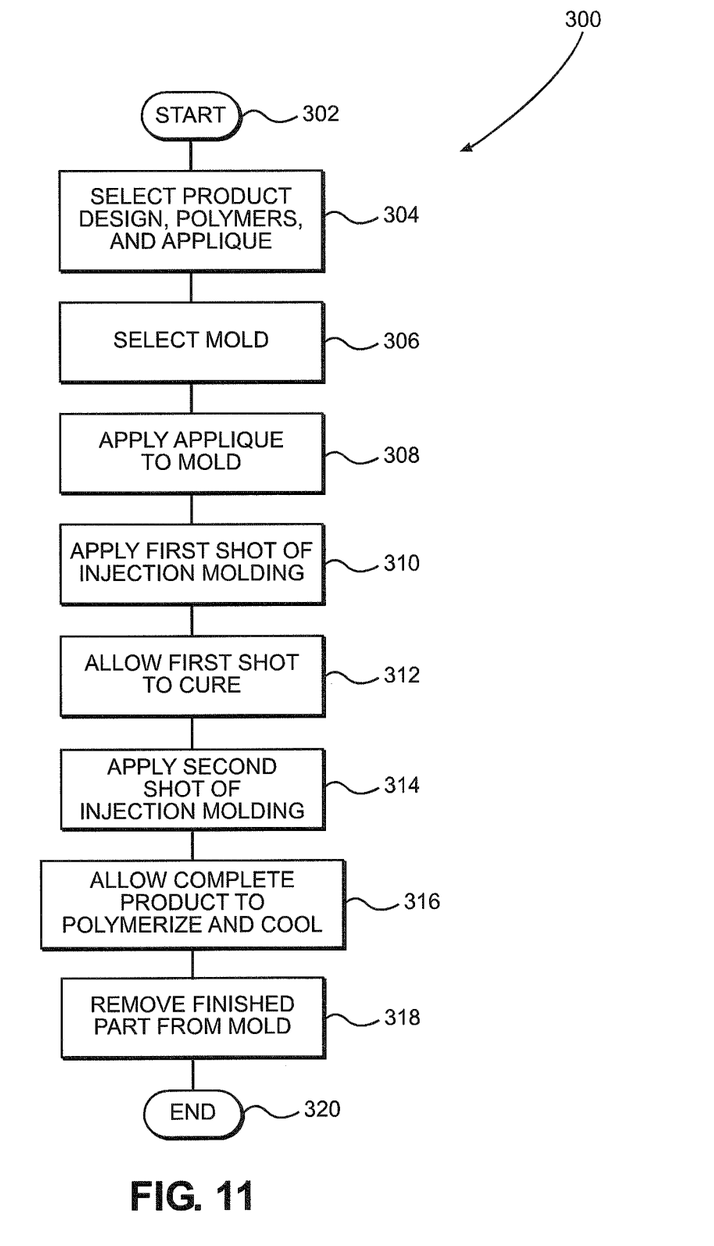
FIG. 11 depicts a flow chart of the two shot IMD process of the present invention, showing the steps from selection of the product design and materials to be employed for the substrate, IMD layer, and overmold, selection of the mold, application of the IMD layer to the mold, injection of the substrate material and allowing it to cure, injection of the overmold material, allowing the complete product to polymerize and cool, to ultimate removal of the finished product from the mold.

Referring finally to FIG. 11, a flow chart describing process of the method of manufacture for polymer sealed in-mold decoration of an exemplary bezel 100 is depicted and generally labeled 300. Process 300 starts 302 at step 304 with the selection of a product to be created through the two shot IMD process, in addition to the polymers required for the substrate 102, IMD layer 104, and overmold 106. An exemplary three layers are described herein, but an alternative embodiment may incorporate additional layers to achieve additional visual effects or other aesthetic properties such as multiple decorations, three dimensional graphics, or a holographic, two-tone, or "candy paint" effect.

The substrate 102 comprises the majority of the structural portion of exemplary bezel 100, and as such may require a more durable or harder polymer, depending on the application. Likewise, a given substrate might be required to have elastic qualities requiring the implementation of a suitable elastomer.

Next, the IMD layer 104 is commonly quite thin commonly ranging from approximately 0.001" to 0.025" and is selected both for aesthetic qualities and for its ability to bond both to the substrate 102 and to the overmold 106 providing structural integrity to the final product. The IMD layer 104 is formed to fit precisely within the mold during the IMD process. The IMD layer 104 can be a flexible material, a rigid material, or even a pigment transferred by a carrier layer. In a preferred embodiment, the IMD layer 104 is a firm body that retains its shape during injection molding. This aids the prevention of wrinkles that might form during injection in a more flexible IMD layer 104. IMD layer 104 can be selected from solid colors or patterns such as geometric patterns, animal prints, tie-dye, or a metallic film among others. It is to be appreciated by those skilled in the art that the above cited examples are not to be considered limiting as any practical material or design may be selected as an IMD layer 104. In an alternative preferred embodiment, the IMD layer 104 is formed of a pigment or coloring that is transferred from a carrier layer during molding, where the carrier layer itself does not become part of the final product.

The IMD layer 104 can be applied using one of the following methods: In-Mold Labeling ("IML"), Three Dimensional IMD ("3D IMD"), or Reel-to-Reel IMD ("IMR"). The first of these three preferred embodiments, IML, makes use of a flat IMD layer formed of a piece of film or polymer foil that is colored or decorated and cut to size conforming substantially to the size and shape of the substrate desired, and placed inside the mold. In this embodiment, the entire film is transferred as the IMD layer 104 and becomes encapsulated during the first shot of two-shot IMD.

The second of these embodiments, 3D IMD, is a "formed" IMD layer that takes the shape and contours of the substrate, fitting precisely within the mold. 3D IMD layer 104 is normally a piece of film or polymer foil that is colored or decorated and contoured and sized to match the shape of the final product.

A third preferred embodiment of applying the IMD layer 104 is "Reel-to-Reel" IMD or "IMR." This category comprises a decorative ink layer and top coat carried on a polymer film, or "carrier layer" that is placed inside the mold during the molding process. The heat and pressure of the injection molding process transfers the ink and top layers from the polymer carrier layer to the substrate 102 during the first shot. The entirety of polymer film in this case is not transferred, only the graphics or colors and top coat are transferred.

Each of the above methods of applying an IMD layer 104 to the substrate can be completed in a number of ways. The process can be accomplished by the two shot IMD process where both the substrate 102 and the overmold 106 are formed in the same process in the same machine or by a "pre-mold/over-mold" process where the substrate 102 and IMD layer 104 are molded in one process, then transferred to the overmold process. The process can also be accomplished by hand, wherein a worker places the IML film or 3D IMD applique within the mold for the first shot, or places the IMR film in such a position that the color or graphical layers, topcoat, or other possible layers are transferred to the substrate during the first shot. Alternatively, an automated system may be employed using robots that physically place the IMD layers 104 for application to the substrate 102. It is to be appreciated by those skilled in the art that the manner of application should not be considered limiting, as several other systems utilizing vacuum pressure, gravity, or other similar means are possible to practice the present invention.

The overmold 106, as stated above, is commonly transparent or translucent. This does not, however, limit the present invention from utilizing a solid color for the overmold and a clear or transparent substrate 102. In an alternative embodiment, both the substrate 102 and the overmold 106 can be selected from non-transparent materials to take advantage of other properties of the three layers. In an alternative embodiment, a thicker ferromagnetic IMD layer 104 is employed taking advantage of the magnetic properties while protecting in the IMD layer 104 material on the interior of the finished product.

Once the materials are selected in step 304, the process 300 proceeds to step 306 where the particular mold for the final product is selected. The preferred embodiment of the mold itself is generally constructed with as many forms for the number of layers of construction required. For the exemplary bezel 100, the mold has two sides, one on either side of the IMD layer 104 and the mold can be adapted to accommodate one of the three preferred methods of applying the IMD layer (IML, 3D IMD, or IMR) as described above. However, the process could involve two or more molds.

Once the mold is selected in step 306, the IMD layer 104 is placed within the mold in step 308 after which the first shot of material that will form substrate 102 is injected in step 310. As described above, the substrate 102 material flows into the mold substantially bonding to one side of the IMD layer 104, leaving the exposed internal portion 108 and exposed external portion 114. It is to be appreciated by those skilled in the art, that a given product created during the two shot IMD process 300 of the present invention may only have an external perimeter 112 (as shown in FIGS. 7 through 10) or multiple internal perimeters 110, depending on the application and the shape of the product required.

Once the substrate 102 is substantially cured in step 312, the second shot is applied in step 314. The timing of application can vary from a few seconds to several hours, depending on the application and the materials involved. In some applications, the substrate 102 with applied IMD layer 104 may undergo the second shot of overmold 106 material while it is still warm, while it is substantially cooled, or while it is completely repolymerized.

In this step 314, the molten overmold 106 material flows into the mold substantially bonding to the other side of the IMD layer 104, and to the exposed internal portion 108 and the exposed external portion 114 of substrate 102. Because both materials are carefully chosen for their compatibility and adherence characteristics, the exposed portions 108 and 114 of substrate 102 and the overmold 106 are allowed to polymerize together and cool in step 316. In the event the IMD layer 104 is also a polymer or other suitable material, the same polymerization and bonding can occur on both sides of the IMD layer 104. This creates a unitary whole from the three formerly separate materials.

Finally, once the product such as bezel 100 is formed by the two shot IMD process 300 of the present invention is cooled, it can be removed from the mold in step 318 constituting the end 320 of the process 300.

While there have been shown what are presently considered to be preferred embodiments of the present invention, it will be apparent to those skilled in the art that various changes and modifications can be made herein without departing from the scope and spirit of the invention.

What is claimed is:

1. A polymer sealed in-mold decoration comprising:
   an in-mold decoration having an in-mold decoration surface area;
   a substrate having a substrate surface area larger than said substrate surface area and an external perimeter, said substrate is bonded to said in-mold decoration, thereby forming an exposed external portion of said substrate extending between said in-mold decoration and said external perimeter of said substrate;
   an overmold bonded to said in-mold decoration and said exposed external portion of said substrate;
   wherein said in-mold decoration is bonded to said substrate and said overmold and is sealed between said substrate and said overmold; and
   wherein said substrate and said overmold are polymerized together.

2. A polymer sealed in-mold decoration comprising:
   an in-mold decoration having an in-mold decoration surface area;
   a substrate having a substrate surface area larger than said substrate surface area and an external perimeter, said substrate is bonded to said in-mold decoration, thereby forming an exposed external portion of said substrate extending between said in-mold decoration and said external perimeter of said substrate;
   an overmold bonded to said in-mold decoration and said exposed external portion of said substrate;
   wherein said in-mold decoration is bonded to said substrate and said overmold and is sealed between said substrate and said overmold; and wherein said substrate, said in-mold decoration, and said overmold are polymerized together to form a single seamless unitary part.

3. A polymer sealed in-mold decoration comprising:
an in-mold decoration having an in-mold decoration surface area;
a substrate having a substrate surface area larger than said substrate surface area and an external perimeter, said substrate is bonded to said in-mold decoration, thereby forming an exposed external portion of said substrate extending between said in-mold decoration and said external perimeter of said substrate;
an overmold bonded to said in-mold decoration and said exposed external portion of said substrate;
wherein said in-mold decoration is bonded to said substrate and said overmold and is sealed between said substrate and said overmold; and
wherein said substrate further comprises an internal perimeter and an exposed internal portion of said substrate extending between said in-mold decoration and said internal perimeter of said substrate.

4. The polymer sealed in-mold decoration of claim 3, wherein said overmold is bonded to said exposed internal portion of said substrate.

5. The polymer sealed in-mold decoration of claim 4, wherein said in-mold decoration layer is hermetically sealed between said substrate and said overmold.

6. The polymer sealed in-mold decoration of claim 4, wherein said substrate, said in-mold decoration, and said overmold form a single seamless unitary part.

7. The polymer sealed in-mold decoration of claim 4, wherein said substrate and said overmold are polymerized together.

8. The polymer sealed in-mold decoration of claim 4, wherein said substrate, said in-mold decoration, and said overmold are polymerized together to form a single seamless unitary part.

* * * * *